(12) United States Patent
McPhail

(10) Patent No.: US 9,223,512 B2
(45) Date of Patent: Dec. 29, 2015

(54) SYSTEM AND METHOD FOR PREDICTING BACKUP DATA VOLUMES

(71) Applicant: International Business Machines Corporation, Armonk, NY (US)

(72) Inventor: Iain McPhail, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 13/914,735

(22) Filed: Jun. 11, 2013

(65) Prior Publication Data

US 2014/0047203 A1     Feb. 13, 2014

(30) Foreign Application Priority Data

Aug. 7, 2012   (GB) .................................. 1214117.2

(51) Int. Cl.
*G06F 3/06* (2006.01)
*G06Q 10/06* (2012.01)
*G06Q 30/02* (2012.01)
*G06F 11/14* (2006.01)

(52) U.S. Cl.
CPC .............. *G06F 3/065* (2013.01); *G06F 3/0604* (2013.01); *G06F 3/0671* (2013.01); *G06Q 10/06315* (2013.01); *G06Q 30/0283* (2013.01); *G06F 11/1448* (2013.01)

(58) Field of Classification Search
CPC ... G06F 3/065; G06F 3/0604; G06F 11/1448; G06F 3/0671; G06Q 10/06315; G06Q 30/0283
USPC .......................................................... 711/162
See application file for complete search history.

(56) References Cited

U.S. PATENT DOCUMENTS 8,688,927 B1 *   4/2014   Chamness ..................... 711/154

FOREIGN PATENT DOCUMENTS

GB           2504717 A       2/2014

* cited by examiner

*Primary Examiner* — Jasmine Song
(74) *Attorney, Agent, or Firm* — L. Jeffrey Kelly; Feb R. Cabrasawan

(57) ABSTRACT

A method and system for predicting the managed backup occupancy of a backup system are disclosed. The method includes determining the variables $m_0$, $x_1$ to $x_n$, $r$ and $z_1$ to $z_n$. Variable $m_0$ is the current managed backup occupancy of the backup system, $x_1$ to $x_n$ are the expected occupancies of backups taken by the backup system per predetermined time period T with retention periods of 0-1 time periods T, 1-2 time periods T, 2-3 time periods T and so on up to n time periods T respectively, $r$ is the expected growth rate of a protected data volume of the backup system per time period T, and $z_1$ to $z_n$ are the data volumes of existing backups that are expected to expire within each of the first to nth time periods T after the current time respectively.

18 Claims, 2 Drawing Sheets

SYSTEM AND METHOD FOR PREDICTING BACKUP DATA VOLUMES

The present application claims the benefit of priority of United Kingdom Patent Application Serial Number 1214117.2 entitled "SYSTEM AND METHOD FOR PREDICTING BACKUP DATA VOLUMES", filed Aug. 7, 2012 with the United Kingdom Intellectual Property Office, the contents of which are incorporated by reference herein in its entirety.

BACKGROUND

1. Field of the Invention

The invention relates to a system and method for projecting future managed backup occupancy in a data backup system.

2. Background of Invention

In many data backup systems, the total volume of data backed up by the system is constantly increasing. In order to manage the acquisition of new backup capacity and ensure that the available capacity is not exceeded, it is necessary to predict how the total volume of data backed up will increase over time.

Modeling how the total volume of data backed up will increase over time is also essential in order to compare the overall cost of providing the necessary backup capacity for a given data volume using different backup systems. Without such modeling, it is impossible to determine whether the cost of moving to a new backup system will be justified over a given period of time.

Prior art systems have not provided a consistent and accurate process for predicting growth in backed up data volumes over time.

SUMMARY

According to an aspect of the present invention, there is provided a method for predicting the managed backup occupancy of a backup system, including: determining variables $m_0$, $x_1$ to $x_n$, $r$ and $z_1$ to $z_n$, where $m_0$ is the current managed backup occupancy of the backup system, $x_1$ to $x_n$ are the expected occupancies of backups taken by the backup system per predetermined time period T with retention periods of 0-1 time periods T, 1-2 time periods T, 2-3 time periods T and so on up to n time periods T respectively, $r$ is the expected growth rate of a protected data volume of the backup system per time period T, and $z_1$ to $z_n$ are the data volumes of existing backups that are expected to expire within each of the first to nth time periods T after the current time respectively; and calculating a predicted managed backup occupancy $m_n$ after n time periods T from the current time based on the variables $m_0$, $x_1$ to $x_n$, $r$ and $z_1$ to $z_n$.

The invention enables prediction of future managed backup occupancy based upon an analysis of current managed backup occupancy, the use of recent backup behavior as a blueprint for how data will continue to be backed up in the future, the application of the concept of critical mass to managed backup occupancy, and the factoring in of compound growth of the protected data volume.

Preferably, the method further includes: measuring average values of $x_1$ to $x_n$ and $r$ for the backup system over a predetermined past time period; and setting the values of $x_1$ to $x_n$ and $r$ used to calculate the predicted managed backup occupancy $m_n$ to the measured average values of $x_1$ to $x_n$ and $r$ respectively. Preferably, the predetermined past time period is the last predetermined time period T.

More preferably, the predicted managed backup occupancy $m_n$ after n time periods T from the current time is calculated by applying the formula:

$$m_n = m_0 + \sum_{n}^{p=1} \left( \sum_{\infty}^{j=p} x_j (1+r)^{1+n-p} \right) - \sum_{n}^{k=1} Z_k$$

Suitably, the predetermined time period T is a year.

Preferably, the method further includes: storing information on the cost of backing up a given volume of data using the backup system and at least one alternative backup system; and calculating a cost comparison between the backup system and the at least one alternative backup system based on the predicted managed backup occupancy $m_n$ and the stored information on the cost of backing up a given volume of data using the backup system and the alternative backup system.

According to another aspect of the invention, there is provided a system for predicting the managed backup occupancy of a backup system, including: a backup system statistics generating unit adapted to generate statistics on the backup system including variables $m_0$, $x_1$ to $x_n$, $r$ and $z_1$ to $z_n$; and a managed backup occupancy predicting unit adapted to receive the variables $m_0$, $x_1$ to $x_n$, $r$ and $z_1$ to $z_n$ from the backup system statistics generating unit, where $m_0$ is the current managed backup occupancy of the backup system, $x_1$ to $x_n$ are the expected occupancies of backups taken by the backup system per predetermined time period T with retention periods of 0-1 time periods T, 1-2 time periods T, 2-3 time periods T and so on up to n time periods T respectively, $r$ is the expected growth rate of a protected data volume of the backup system per time period T, and $z_1$ to $z_n$ are the data volumes of existing backups that are expected to expire within each of the first to nth time periods T after the current time respectively, and the managed backup occupancy predicting unit is adapted to calculate a predicted managed backup occupancy $m_n$ after n time periods T from the current time based on the variables $m_0$, $x_1$ to $x_n$, $r$ and $z_1$ to $z_n$.

Preferably, the backup system statistics generating unit is adapted to: measure average values of $x_1$ to $x_n$ and $r$ for the backup system over a predetermined past time period; and set the values of $x_1$ to $x_n$ and $r$ used to calculate the predicted managed backup occupancy $m_n$ to the measured average values of $x_1$ to $x_n$ and $r$ respectively. Suitably, the predetermined past time period is the last predetermined time period T.

More preferably, the managed backup occupancy predicting unit is adapted to calculate the predicted managed backup occupancy $m_n$ after n time periods T from the current time by applying the formula:

$$m_n = m_0 + \sum_{n}^{p=1} \left( \sum_{\infty}^{j=p} x_j (1+r)^{1+n-p} \right) - \sum_{n}^{k=1} Z_k$$

Suitably, the predetermined time period T is a year.

In one embodiment, the backup system statistics generating unit is connected to the backup system via a backup system interface, is adapted to retrieve statistics on the backups taken by the backup system by querying the backup system, and is adapted to generate the variables based on the retrieved statistics. Alternatively, the backup system statistics generating unit is connected to a user input device, is adapted to receive statistics input by a user on the backups taken by the backup system, and is adapted to generate the variables based on the retrieved statistics.

Preferably, the system further includes: a storage unit storing information on the cost of backing up a given volume of data using the backup system and at least one alternative backup system; and a cost calculation engine connected to the managed backup occupancy predicting unit and the storage unit, wherein the managed backup occupancy predicting unit is adapted to transmit the predicted managed backup occupancy $m_n$ to the cost calculation engine, and the cost calculation engine is adapted to calculate a cost comparison between the backup system and the at least one alternative backup system based on the predicted managed backup occupancy $m_n$ and the stored information on the cost of backing up a given volume of data using the backup system and the alternative backup system.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
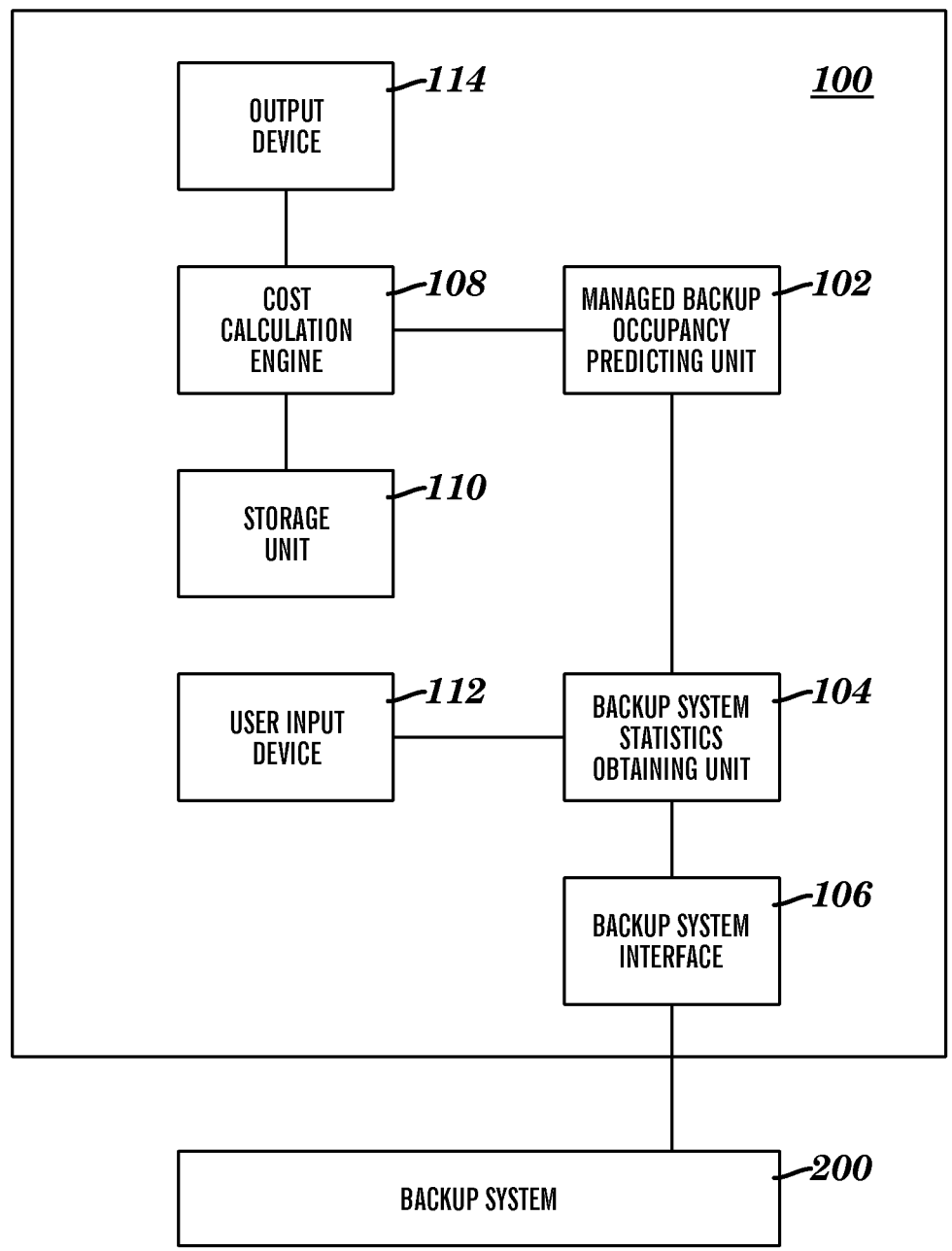
FIG. 1 illustrates a system for predicting the managed backup occupancy of a backup system according to an embodiment of the invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Terms used in the following description are defined below:

"Managed backup occupancy" is the amount of backup volume, or backed up data, currently being managed by the backup environment. This is sometimes thought of as the volume of data held on tape but of course backups can also be held on virtual tape, disks or other storage media. This figure does not include any compression or deduplication of the backup data. It is the same as the amount of storage that would be required if all backups held were restored individually.

"Backup capacity" is the total size of the current backup environment or the maximum possible managed backup occupancy with the current infrastructure without adding additional tapes, libraries etc. The backup capacity is sometimes thought of as the total available tape media but again of course backups can also be held on virtual tape, disks and other storage media. The backup capacity does not include any compression or deduplication of the backup data.

"Protected data volume" is the total of all the data volumes on the servers that are being backed up. This volume is independent of backup frequency, backup type, or retention period. The protected data volume is sometimes referred to as "primary" storage volume but can also include snapshot copies of data volumes.

"Critical mass" is the point at which, without any growth of the protected data volume, the managed backup occupancy stops growing. This is the point at which the backup system has been in operation for longer than its longest retention period. At the point of critical mass, the volume of new backups is equal to the volume of backups expiring.

Few backup environments have reached critical mass completely owing to long retention periods, i.e. 5-7 years and longer. The server estate being backed up is also expected to grow over time in most environments, resulting in larger backups being taken.

The managed data occupancy will change due to:

new backups being taken, protected data volume growth resulting in bigger backups over time, and backups expiring.

In the majority of cases, the managed data occupancy is expected to increase over time.

An aim of the embodiment of the invention described below is to project the expected managed data occupancy at the ends of the first, second and third years from the time of prediction. These years will be referred to as year 1, year 2 and year 3 respectively.

The invention uses last year's backups as a blueprint of how data is going to be backed up in the future, excluding growth of the protected data volume. This blueprint can be applied in a compound manner across future time periods.

In order to explain the data volume growth forecasting model of the invention, a specific example of one application of the invention will be described below.

In the example data backup system, over the last 12 months, "$x_1$" Terabytes (TB) was written with a retention period of less than 1 year, "$x_2$" TB was written with a retention period of 1-2 years, and "$x_3$" TB was written with a retention period of longer than 2 years. The retention period is the period of time the backup data is kept before it expires and is discarded. The retention period will vary between different types of data backed up by the system.

In the simplest version of the model, the managed backup occupancy after year 1, year 2 and year 3 is calculated based only on the volume of backup data stored in the past year and its retention periods. As a concrete example, take $x_1=100$, $x_2=40$ and $x_3=30$. Then after one year the estimated managed backup occupancy of the system would be:

$$\begin{aligned}\text{Year 1 managed backup occupancy} &= (x_1 + x_2 + x_3)\\&= (100 + 40 + 30)\\&= 170\end{aligned}$$

After two years the managed backup occupancy of the system would be:

Year 2 managed backup occupancy $= (x_2 + x_3) + (x_1 + x_2 + x_3)$ $= (40 + 30) + (100 + 40 + 30)$ $= 240$ After three years the managed backup occupancy of the system would be:

Year 3 managed backup occupancy $= (x_3) + (x_2 + x_3) + (x_1 + x_2 + x_3)$ $= (30) + (40 + 30) + (100 + 40 + 30)$ $= 270$ The second step in modeling the growth of backup data more accurately is to consider the impact of growth on the protected data volume and apply this to the formulae above.

If we assume that the protected data volume grows by a factor r per year then we also expect the occupancy to increase proportionally. It follows that even if a backup environment has reached critical mass then the managed backup occupancy may be expected to increase. This is the other main reason for occupancy increasing year on year.

The invention applies the growth rate to the year 1 figures to represent the volume of backup data at the end of the year. As before, the figures $x_1$, $x_2$ and $x_3$ come from the previous 12 months and are taken to represent the volumes at the start of the year.

To calculate the size of each data volume after a year's growth, the data volume is multiplied by $(1+r)$. For example, applying growth to the data volume $x_1$ would give us $x_1*(1+r)$ after year 1, $x_1*(1+r)^2$ after year 2, and $x_1*(1+r)^3$ after year 3.

As a concrete example, take r=30% or 0.3. At the end of year 1 the estimated managed backup occupancy of the system would be:

Year 1 managed backup occupancy $= x_1(1+r) + x_2(1+r) + x_3(1+r)$ $= 100 * 1.3 + 40 * 1.3 + 30 * 1.3$ $= 221 \ TB$ After year 2, without growth we were expecting to have "$x_2$ and "$x_3$" from year one in addition to "$x_1$", "$x_2$" and "$x_3$" from year two. Accounting for growth, at the end of year 2 the estimated managed backup occupancy of the system would be:

Year 2 managed backup occupancy $= x_2(1+r) + x_3(1+r) +$ $x_1(1+r)^2 + x_2(1+r)^2 + x_3(1+r)^2$ $= 378.3 \ TB$ Similarly, accounting for growth at the end of year 3 the estimated managed backup occupancy of the system would be:

Year 3 managed backup occupancy $= x_3(1+r) + x_2(1+r)^2 + x_3(1+r)^2 +$ $x_1(1+r)^3 + x_2(1+r)^3 + x_3(1+r)^3$ $= 530.79 \ TB$ The final stage in improving the accuracy of the model is accounting for the impact of existing backups expiring on occupancy over time.

The data volumes of existing backups expected to expire during year 1, year 2 and year 3 are labeled as $z_1$, $z_2$ and $z_3$ TB respectively.

Assume that the data backup system starts with a managed backup occupancy of $m_0$, and take $m_0$=300 TB as a specific example. In the specific example, 70 TB of existing backup data is expected to expire in year 1, 35 TB is expected to expire in year 2 and 25 TB is expected to expire in year 3. Hence, $z_1$=70, $z_2$=35 and $z_0$=25.

At the end of each year the occupancy will be:
original occupancy, $m_0$
+ occupancy required for that year based on new backup retention periods and growth
− backups that will have expired by the end of that year, $$\sum_{n}^{k=1} z_k$$

for year n

Accounting for growth and the expiry of existing backups, at the end of year 1 the estimated managed backup occupancy of the system would be:

Year 1 managed backup occupancy, $m_1 = m_0 + x_1(1+r) + x_2(1+r) + x_3(1+r) - z_1$ $= 300 + 100 * 1.3 + 40 * 1.3 + 30 * 1.3 - 70$ $= 451$ Similarly, at the end of year 2 the estimated managed backup occupancy of the system would be:

Year 2 managed backup occupancy, $m_2 = m_0 + x_2(1+r) + x_3(1+r) + x_1(1+r)^2 +$ $x_2(1+r)^2 + x_3(1+r)^2 - z_1 - z_2$ $= 573.3$ At the end of year 3 the estimated managed backup occupancy of the system would be:

Year 3 managed backup occupancy, $m_3 = m_0 + x_3(1+r) + x_2(1+r)^2 + x_3(1+r)^2 +$ $x_1(1+r)^3 + x_2(1+r)^3 - (1+r)^3 - z_1 - z_2 - z_3$ $= 700.79$ The above example has been given for a period of three years, which is usually enough time to assess whether investment in a new backup system is worthwhile. However, the invention is not limited to this time period and the model can be generalized to any number of years.

The general formula for estimating the managed back up occupancy $m_n$ at the end of year n is:

$$m_n = m_o + \sum_{n}^{p=1} \left( \sum_{\infty}^{j=p} (1+r)^{1+n-p} \right) - \sum_{n}^{k=1} Zk \quad \text{[Formula 1]}$$

In order to predict the managed backup occupancy at the end of year n using the present invention, the following data are first determined by an examination of the current backup system:

The current managed backup occupancy, $m_0$

The occupancies of backups taken in the last 12 months with retention periods of 0-1 years, 1-2 years, 2-3 years and so on up to n years, i.e. $x_1$ to $x_n$ The annual growth rate of the protected data volume, r The existing backups that will expire within each of years 1 to n, i.e. $z_1$ to $z_n$ The annual growth rate can be estimated to be the same as the growth rate over the last 12 months, or can be estimated more accurately by averaging the growth rate over several previous years. A better estimate of r can also be made by taking into account the plans of the operator of the backup system to increase the protected data volume in the future.

Once the variables $m_0$, $x_1$ to $x_n$, r and $z_1$ to $z_n$ have been determined, Formula 1 above is applied to calculate the expected managed backup occupancy $m_n$ after n years. The system of the invention may take the form of software or dedicated hardware for applying Formula 1 to the above variables.

An example of a system 100 according to the present invention is shown in FIG. 1. By way of example, the output device 114 may be an LCD display, the user input device 112 may be a keyboard and the storage unit 110 may be a hard disk drive. The cost calculation engine 108, the managed backup occupancy predicting unit 102 and the backup system statistics generating unit 104 may be software modules running on a general purpose processor or may be dedicated circuits. The backup system interface 106 may include a modem or any other means of communication connected to the backup system 200.

The above variables may either be input into the system 100 of the invention manually by a user or may be acquired automatically by the system. In this embodiment, the system 100 has a backup system statistics generating unit 104 and a backup system interface 106, which is connected to the backup system 200. The backup system statistics generating unit 104 queries the backup system 200 so as to retrieve statistics on the backups taken over a predetermined time period, for example the last 12 months. The system 100 also has a user input device 112, which may be used to input the statistics manually.

Specifically, the backup system statistics generating unit 104 retrieves the current managed backup occupancy, the retention periods and data volumes of backups taken over the predetermined time period, and the expiry dates of existing backups from the backup system 200. It will be appreciated that the variables $m_0$, $x_1$ to $x_n$, r and $z_1$ to $z_n$ can be determined straightforwardly from this data. The backup system statistics generating unit 104 processes the retrieved data to generate each of these variables and transmits the variables to the managed backup occupancy predicting unit 102. The managed backup occupancy predicting unit 102 then applies Formula 1 to generate the value $m_n$.

The system 100 may generate values of $m_n$ for multiple years, typically from year 1 to a desired number of years N from the present time. These values, $m_1$ to $m_N$, may be converted by the system 100 into a graph or chart, for example a bar chart showing the change in managed data occupancy over time.

In this embodiment, the system 100 also includes a cost calculation engine 108. This component holds information on the cost of backing up a given volume of data using a given backup system, which has typically been researched and entered into the system 100 previously. The values $m_1$ to $m_N$ are input into the cost calculation engine 108, which then calculates a cost comparison between the existing backup system 200 used by the operator and a range of alternative backup systems over the N year time period. This allows the operator to determine the best possible backup system for their individual needs.

As an example, the storage unit 110 may contain a lookup table for the cost calculation engine 108 having rows corresponding to different volumes of data and columns corresponding to different backup systems. The entry at a given row and column of the lookup table is the cost of backing up the corresponding volume of data using the corresponding backup system. The cost calculation engine 108 queries the lookup table using the data volumes m1 to mN and retrieves the corresponding cost for each backup system in the cost comparison. The costs for each backup system are then summed by the cost calculation engine 108 to give the cost comparison over N years. Alternatively, the cost calculation engine 108 may include a mathematical model of the cost of each backup system by data volume, which can be used to determine the cost for that backup system for any arbitrary data volume.

While the counter n has been used to indicate a number of years in this embodiment, it will be appreciated that Formula 1 can be applied to any other time period. As a non-limiting example, n could be a counter for quarters, i.e. three month periods. In this case data for the previous three months of backups would be used to calculate the managed backup occupancy for future quarters using Formula 1. In this modification, the variables in Formula 1 would represent the following:

The current managed backup occupancy, $m_0$

Figure 2:
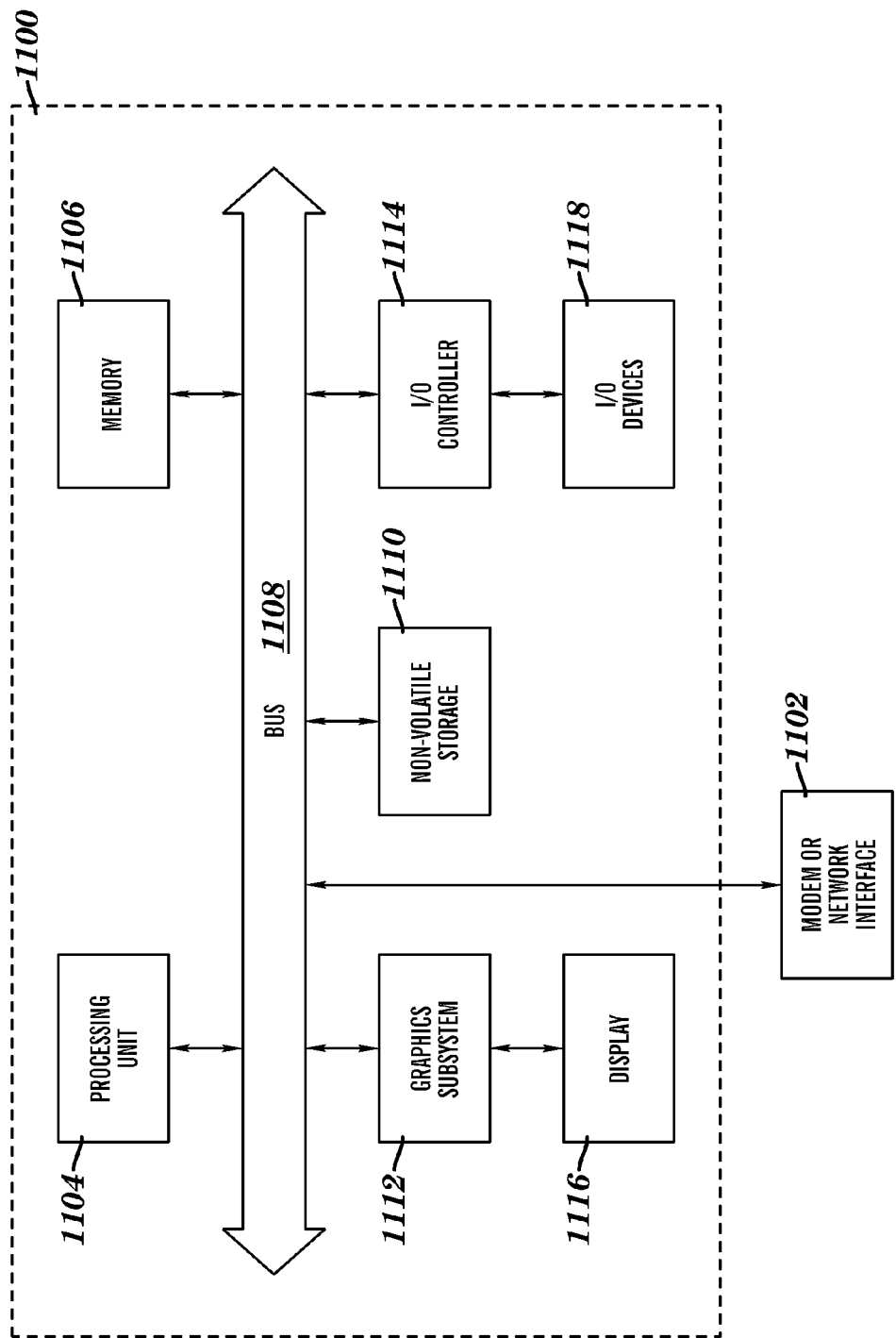
FIG. 2 illustrates an exemplary embodiment of a computer system that may be used in various elements of the present invention.

The occupancies of backups taken in the last quarter with retention periods of 0-1 quarters, 1-2 quarters, 2-3 quarters and so on up to n quarters, $x_1$ to $x_n$ The quarterly growth rate of the protected data volume, r The existing backups that will expire within each of quarters 1 to n, $z_1$ to $z_n$ FIG. 2 illustrates an exemplary computer architecture 1100 by which the managed backup occupancy prediction system 100 according to the invention and the backup system 200 may be implemented. Computer architecture 1100 may be or form part of a desktop computer or a laptop computer, a server or any similar computer device, but the backup system 200 is preferably implemented as a stand alone server.

The computer architecture 1100 may interface to external devices, such as the backup system 200 in the case of the prediction system 100, through a modem or network interface 1102, such as an analogue modem, ISDN modem, cable modem, token ring interface, or satellite transmission interface. The interface 1102 may include the backup system interface 106. As shown in FIG. 2, the computer architecture 1100 includes a processing unit 1104, which may be a conventional microprocessor, such as an Intel Pentium microprocessor, an Intel Core Duo microprocessor, or a Motorola Power PC microprocessor, which are known to one of ordinary skill in the computer art. The microprocessor may perform the functions of the cost calculation engine 108, the managed backup occupancy predicting unit 102 and the backup system statistics generating unit 104 for example.

System memory 1106 is coupled to the processing unit 1104 by a system bus 1108. System memory 1106 may be a DRAM, RAM, static RAM (SRAM) or any combination thereof. Bus 1108 couples processing unit 1104 to system memory 1106, to nonvolatile storage 1110, to graphics subsystem 1112 and to input/output (I/O) controller 1114. Graphics subsystem 1112 controls a display device 1116, such as a liquid crystal display, which may be part of the graphics subsystem 1112. The display device 1116 may be the output device 114 described above. The I/O devices 1118 may be the user input device 112 and may include one or more of a keyboard, disk drives, printers, a mouse, a touch screen and the like as known to one of ordinary skill in the computer art.

The managed backup occupancy prediction system 100 control software will normally be stored on the non-volatile storage 1110. Thus, it may be stored on the machine's hard drive, or possibly on an externally connectable storage medium, such as a USB memory stick or a CD. These two devices would then constitute part of the I/O devices shown as item 1118 in FIG. 2. The non-volatile storage may also include the storage unit 110.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for predicting the managed backup occupancy of a backup system, the method comprising:

generating statistics on the backup system over a period of time, the statistics include variables $m_0$, $x_1$ to $x_n$, r and $z_1$ to $z_n$, where $m_0$ is the current managed backup occupancy of the backup system, $x_1$ to $x_n$ are the expected occupancies of backups taken by the backup system per a predetermined time period T with retention periods of 0-1 time periods T, 1-2 time periods T, 2-3 time periods T and so on up to n time periods T respectively, r is the expected growth rate of a protected data volume of the backup system per time period T, and $z_1$ to $z_n$ are the data volumes of existing backups that are expected to expire within each of the first to $n^{th}$ time periods T after the current time respectively;

calculating a predicted managed backup occupancy $m_n$ after n time periods T from the current time based on the variables $m_0$, $x_1$ to $x_n$, r and $z_1$ to $z_n$, by applying the formula:

$$m_n = m_0 + \sum_{n}^{p=1}\left(\sum_{\infty}^{j=p} x_j(1+r)^{1+n-p}\right) - \sum_{n}^{k=1} Z_k;$$

storing information on a cost of backing up a given volume of data using the backup system and at least one alternative backup system; and calculating a cost comparison over N years between the backup system and the at least one alternative backup system based on the predicted managed backup occupancy $m_n$ and the stored information on the cost of backing up a given volume of data using the backup system and the at least one alternative backup system.

2. The method according to claim 1, further comprising:
measuring average values of $x_1$ to $x_n$ and r for the backup system over a predetermined past time period; and
setting the values of $x_1$ to $x_n$ and r used to calculate the predicted managed backup occupancy $m_n$ to the measured average values of $x_1$ to $x_n$ and r respectively.

3. The method according to claim 2, wherein the predetermined past time period is the last predetermined time period T.

4. The method according to claim 1, wherein the predetermined time period T is a year.

5. The method according to claim 1, wherein generating the statistics on the backup system over the period of time comprises:
retrieving data on backups taken by the backup system by querying the backup system; and
generating the variables based on the retrieved data.

6. The method according to claim 1, wherein generating the statistics on the backup system over the period of time comprises:
receiving data input by a user on backups taken by the backup system; and
generating the variables based on the received data.

7. A computer system for predicting the managed backup occupancy of a backup system, the system comprising:
one or more computer processors, one or more non-transitory computer-readable storage media, and program instructions stored on the one or more non-transitory computer-readable storage media for execution by at least one of the one or more processors, the program instructions comprising:

program instructions to generate statistics on the backup system over a period of time, the statistics include variables $m_0$, $x_1$ to $x_n$, r and $z_1$ to $z_n$, where $m_0$ is the current managed backup occupancy of the backup system, $x_1$ to $x_n$ are the expected occupancies of backups taken by the backup system per a predetermined time period T with retention periods of 0-1 time periods T, 1-2 time periods T, 2-3 time periods T and so on up to n time periods T respectively, r is the expected growth rate of a protected data volume of the backup system per time period T, and $z_1$ to $z_n$ are the data volumes of existing backups that are expected to expire within each of the first to nth time periods T after the current time respectively;

program instructions to calculate a predicted managed backup occupancy $m_n$ after n time periods T from the current time based on the variables $m_0$, $x_1$ to $x_n$, r and $z_1$ to $z_n$, by applying the formula:

$$m_n = m_0 + \sum_{n}^{p=1}\left(\sum_{\infty}^{j=p} x_j(1+r)^{1+n-p}\right) - \sum_{n}^{k=1} Z_k;$$

program instructions to store information on a cost of backing up a given volume of data using the backup system and at least one alternative backup system; and program instruction to calculate a cost comparison over N years between the backup system and the at least one alternative backup system based on the predicted managed backup occupancy $m_n$ and the stored information on the cost of backing up a given volume of data using the backup system and the at least one alternative backup system.

8. The computer system according to claim 7, further comprising:

program instructions to measure average values of $x_1$ to $x_n$ and r for the backup system over a predetermined past time period; and program instructions to set the values of $x_1$ to $x_n$ and r used to calculate the predicted managed backup occupancy $m_n$ to the measured average values of $x_1$ to $x_n$ and r respectively.

9. The computer system according to claim 8, wherein the predetermined past time period is the last predetermined time period T.

10. The computer system according to claim 7, wherein the predetermined time period T is a year.

11. The computer system according to claim 7, wherein the program instructions to generate the statistics on the backup system over the period of time further comprises:

program instructions to retrieve data on backups taken by the backup system by querying the backup system; and program instructions to generate the variables based on the retrieved data.

12. The computer system according to claim 7, wherein the program instructions to generate the statistics on the backup system over the period of time further comprises:

program instructions to receive data input by a user on backups taken by the backup system; and program instructions to generate the variables based on the received data.

13. A computer program product for predicting the managed backup occupancy of a backup system, the computer program product comprising:

one or more non-transitory computer-readable storage media and program instructions stored on the one or more non-transitory computer-readable storage media, the program instructions comprising:

program instructions to generate statistics on the backup system over a period of time, the statistics include variables $m_0$, $x_1$ to $x_n$, r and $z_1$ to $z_n$, where $m_0$ is the current managed backup occupancy of the backup system, $x_1$ to $x_n$ are the expected occupancies of backups taken by the backup system per a predetermined time period T with retention periods of 0-1 time periods T, 1-2 time periods T, 2-3 time periods T and so on up to n time periods T respectively, r is the expected growth rate of a protected data volume of the backup system per time period T, and $z_1$ to $z_n$ are the data volumes of existing backups that are expected to expire within each of the first to nth time periods T after the current time respectively;

program instructions to calculate a predicted managed backup occupancy $m_n$ after n time periods T from the current time based on the variables $m_0$, $x_1$ to $x_n$, r and $z_1$ to $z_n$, by applying the formula:

$$m_n = m_0 + \sum_{n}^{p=1}\left(\sum_{\infty}^{j=p} x_j(1+r)^{1+n-p}\right) - \sum_{n}^{k=1} Z_k;$$

program instructions to store information on a cost of backing up a given volume of data using the backup system and at least one alternative backup system; and program instruction to calculate a cost comparison over N years between the backup system and the at least one alternative backup system based on the predicted managed backup occupancy $m_n$ and the stored information on the cost of backing up a given volume of data using the backup system and the at least one alternative backup system.

14. The computer program product according to claim 13, further comprising:

program instructions to measure average values of $x_1$ to $x_n$ and r for the backup system over a predetermined past time period; and program instructions to set the values of $x_1$ to $x_n$ and r used to calculate the predicted managed backup occupancy $m_n$ to the measured average values of $x_1$ to $x_n$ and r respectively.

15. The computer program product according to claim 14, wherein the predetermined past time period is the last predetermined time period T.

16. The computer program product according to claim 13, wherein the predetermined time period T is a year.

17. The computer program product according to claim 13, wherein the program instructions to generate the statistics on the backup system over the period of time further comprises:

program instructions to retrieve data on backups taken by the backup system by querying the backup system; and program instructions to generate the variables based on the retrieved data.

18. The computer program product according to claim 13, wherein the program instructions to generate the statistics on the backup system over the period of time further comprises:

program instructions to receive data input by a user on backups taken by the backup system; and program instructions to generate the variables based on the received data.

* * * * *